March 3, 1964  T. N. TYLER  3,123,790

ELECTRICAL APPARATUS

Filed July 10, 1961

INVENTOR.
TOMMY N. TYLER

BY Arthur H. Swanson

ATTORNEY.

United States Patent Office 3,123,790
Patented Mar. 3, 1964

3,123,790
ELECTRICAL APPARATUS
Tommy N. Tyler, Littleton, Colo., assignor to Minneapolis-Honeywell Regulator Company, Minneapolis, Minn., a corporation of Delaware
Filed July 10, 1961, Ser. No. 122,871
2 Claims. (Cl. 338—28)

The present invention relates to transducers. More specifically, the present invention relates to temperature sensitive transducers.

An object of the present invention is to provide an improved temperature sensitive transducer.

Another object of the present invention is to provide an improved temperature-sensitive transducer for use in measuring internal bodily temperatures.

A further object of the present invention is to provide an improved temperature-sensitive transducer which is adaptable to conventional sterilization techniques.

A still further object of the present invention is to provide an improved temperature-sensitive transducer, as set forth herein, which is characterized by a simplicity of operation and construction.

In accomplishing these and other objects, there has been provided, in accordance with the present invention, a temperature-sensitive transducer having a temperature responsive resistance element enclosed within a thermally conductive structure. This structure includes a metallic shell which is adapted to intimately contact a source of a temperature to be measured to provide a thermally conductive path between the source and the resistance element having electrical conductive isolation therebetween. The thermally conductive structure is arranged to be supported on the temperature source by an attaching means which means is also arranged to electrically connect the resistance element to a temperature measuring apparatus.

A better understanding of the present invention may be had from the following detailed description, when read in connection with the associated drawings in which.

Figure 1:
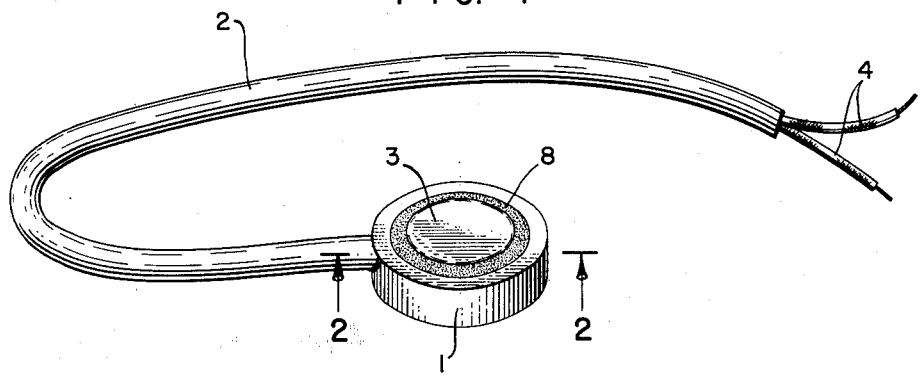
FIG. 1 is a pictorial representation of the transducer of the present invention.

Referring to FIG. 1 in more detail there is shown a transducer housing 1 attached to the end of a hollow supporting clip 2. The housing 1 is arranged to support a transducer element 3 which is electrically connected to a measuring device by a pair of wires 4 passing through the clip 2.

Figure 2:
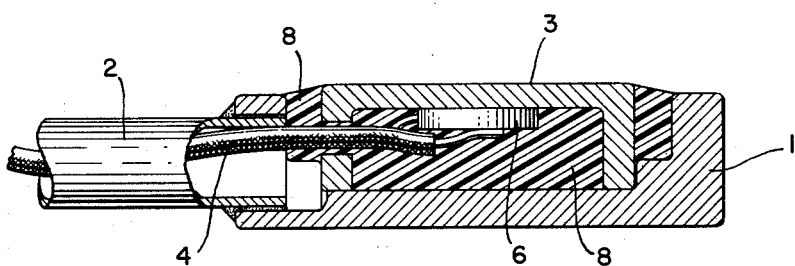
FIG. 2 is a cross-sectional representation of FIG. 1 taken along line 2—2.

Referring to FIG. 2, there is shown a cross-section of the housing 1 and clip 2 shown in FIG. 1. The transducer element 3 is arranged as hollow metallic cup which is nested within the housing 1 with an annular space therebetween. The cup element 3 has a temperature-sensitive resistance element 6 attached to an inside surface of the cup element 3. The resistance element 6 is attached to the cup 3 to form a thermally-conducting path between the resistance element 6 and an outside surface of the cup 3 which surface is arranged to project past the housing 1. This surface is arranged to project above the housing 1 whereby to afford an intimate physical contact with the cup element 3 and a heat source whose temperature is to be measured.

The cup element 3 may advantageously be made of a non-corrosive material, such as aluminum, having a high heat-conductivity characteristic. Further, the outside surfaces of the cup 3 may be anodized to effect a superior corrosion resistant surface having electrical conduction insulating properties whereby to maintain a uniform heat-conductivity characteristic and to electrically isolate the resistance element 6.

The resistance element 6 is electrically attached to the wires 4 to be connected as a temperature-sensitive element in a temperature measuring device. The annular space between the cup 3 and the housing 1 and the space in the cup 3 surrounding the element 6 may be filled with a potting compound 8 to retain the components in a fixed position whereby to protect these components and to provide additional electrical isolation of the resistance element 6.

In operation, the transducer of the present invention is connected to a measuring apparatus by means of the connecting wires 4. The clip 2 and the housing 1 are arranged to support the cup 3 against a surface having a temperature to be measured. For example, to measure the temperature of a human body, the clip 2 may be arranged to hold the housing 2 and the cup 3 against an inside surface of the mouth by pressing the cup 3 against an inside surface of the cheek. Thus, the clip 2 would be shaped to fit the configuration of the inside and the outside surface of the cheek. In this position, the cup 3 is effective to hold the resistance element 6 in a thermally-conducting relationship with the inside surface of the cheek. A measurement of the resistance of the resistance element 6 would be indicative of the temperature of the inside surface of the cheek. It is to be noted that the construction of this transducer makes the structure readily adaptable to conventional sterilization techniques without damage to the components thereof.

Thus, it may be seen that there has been provided, in accordance with the present invention, a temperature-sensitive transducer for use in measuring internal bodily temperatures and which transducer is adaptable to be sterilized.

What is claimed is:

1. A transducer comprising a temperature sensitive resistor, an anodized aluminum cup, means for attaching said resistor to an inside surface of said cup in a thermally conductive relationship with an anodized outside surface of said cup, a cup housing, means for supporting said cup in said housing with electrical and thermal isolation from said cup housing and with said outside surface of said cup projecting outside of said housing, clip-type hollow support means attached to said housing for clipping said cup housing on a heat source having a temperature to be measured with said projecting surface of said cup in intimate contact with an external surface of said heat source, and a pair of wires connected to said resistor and passing through said support means for connecting said resistor to related apparatus.

2. A transducer as set forth in claim 1 wherein said cup means and said cup housing are filled with a potting compound.

References Cited in the file of this patent

UNITED STATES PATENTS

| | | |
|---|---|---|
| 2,422,925 | Rady et al. | June 24, 1947 |
| 2,750,483 | Voorman | June 12, 1956 |
| 2,780,703 | Macintyre | Feb. 5, 1957 |